No. 875,892.

PATENTED JAN. 7, 1908.

T. V. BUCKWALTER.
MECHANICAL MOVEMENT.
APPLICATION FILED MAR. 21, 1907.

2 SHEETS—SHEET 1.

WITNESSES:

INVENTOR

BY

ATTORNEY.

No. 875,892. PATENTED JAN. 7, 1908.
T. V. BUCKWALTER.
MECHANICAL MOVEMENT.
APPLICATION FILED MAR. 21, 1907.

2 SHEETS—SHEET 2.

WITNESSES:
Rob't R. Kitchel.
Theo. Rosemand.

INVENTOR
Tracy V. Buckwalter
BY
Chas. N. Butler
ATTORNEY.

UNITED STATES PATENT OFFICE.

TRACY V. BUCKWALTER, OF ALTOONA, PENNSYLVANIA.

MECHANICAL MOVEMENT.

No. 875,892.        Specification of Letters Patent.        Patented Jan. 7, 1908.

Application filed March 21, 1907. Serial No. 363,558.

*To all whom it may concern:*

Be it known that I, TRACY V. BUCKWALTER, a citizen of the United States, residing in the city of Altoona, in the county of Blair and State of Pennsylvania, have invented certain Improvements in Mechanical Movements, of which the following is a specification.

This invention is a mechanical movement for connecting a revolving shaft with wheels movable angularly with relation thereto. It is particularly adapted for connecting the driving shaft with a vehicle wheel having a knuckle joint permitting it to oscillate about an axis transverse to the shaft.

In its preferred construction, the invention comprises a revoluble shaft, a driving wheel connected therewith by a universal joint, a traction wheel with a driving wheel fixed thereto adapted to oscillate on a vertical axis and a connection between the driving and driven wheels.

Figure 1:
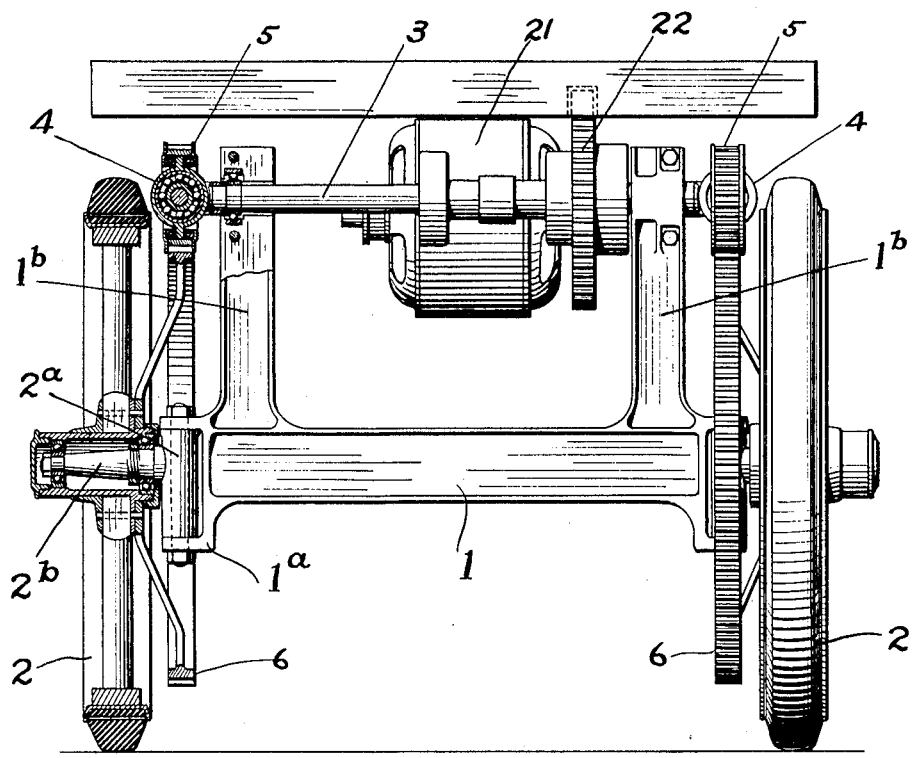
Figure 2:
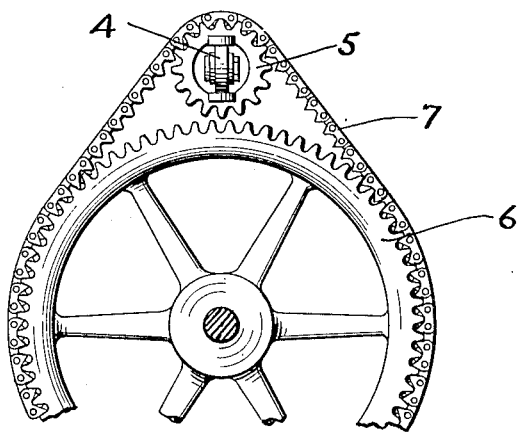
Figure 3:
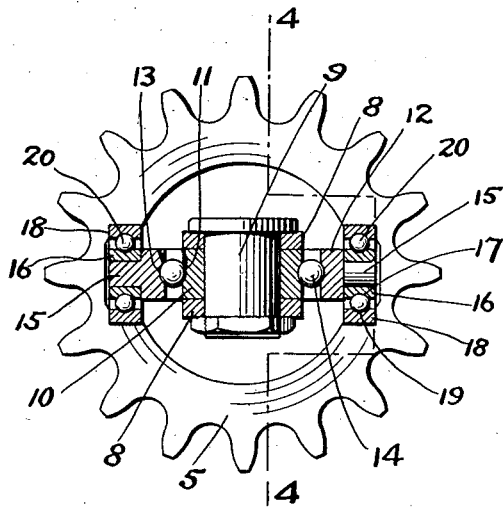
Figure 4:
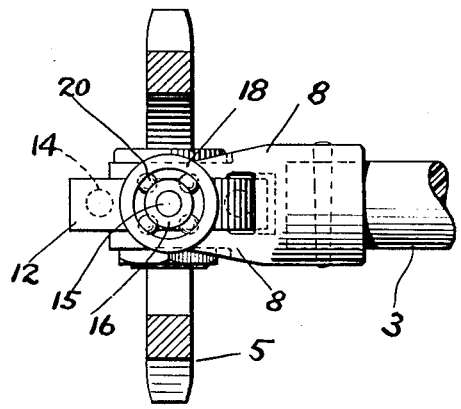

In the accompanying drawings, Figure 1 is an end elevation of a baggage truck, with parts shown in section, in illustration of the application of the invention; Fig. 2 is a side elevation representing the application of the invention to wheels connected by a chain; Fig. 3 is a side elevation of a wheel with a sectional view of a universal joint by which it is movable on axes transverse to each other; Fig. 4 is a sectional view of a wheel and a side view of the end of a shaft connected thereto by a universal joint having transverse axes; and Fig. 5 is a view similar to Fig. 4 with parts broken away on different lines.

In Fig. 1 of the drawings, I have shown a baggage truck having an axle or beam 1 with end bearings 1ª in which are pivotally connected the traction wheels 2 by means of the knuckles 2ª on their spindles 2ᵇ. The struts 1ᵇ supported by the beam 1 have journaled thereon the shaft 3. This shaft is connected by universal joints 4 with pinions 5, which engage the spur wheels 6 fixed to the traction wheels. The engagement between the wheels 5 and 6 may be direct, as shown in Fig. 1, or indirect, through a chain 7, as shown in Fig. 2.

Figure 5:
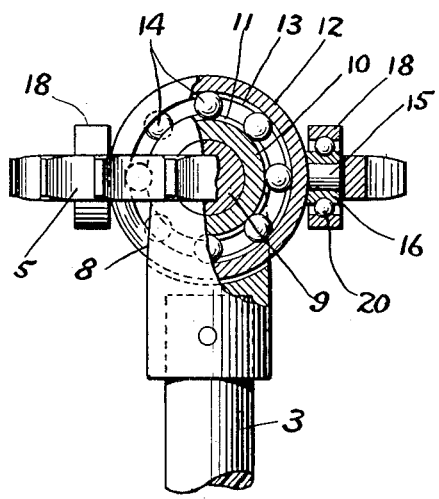

As shown in detail in Figs. 3 to 5 inclusive, the shaft 3 has at the ends thereof the bifurcations 8 between which a pin 9 holds a ring 10 having a race 11. Surrounding the ring 10 is a ring 12 having a race 13 corresponding to the race 11, and in these races are placed balls 14 upon which the outer revolves freely about the inner ring. Diametrically disposed hubs 15 on the ring 12 have thereon rings 16 provided with races 17. Rings 18 are fixed in the wheel 5 and surround the rings 16. Within the rings 18 are the races 19 corresponding to the races 17 and within the races are balls 20 by means of which the rings 18 are freely revoluble on the rings 16. Free movement is thus provided for the wheel 5 on axes transverse to each other. There is thus formed a connection between the driving shaft 3 and the driven wheels 2, 5, and 6, permitting the latter to oscillate freely about the axis of the corresponding knuckle joint formed by the bearings 1ª and the knuckle 2ª, so that the shaft, suitably driven from a motor 21 through gearing 22, will transmit its motion to the traction wheels through the driving gears connecting them regardless of the position to which such wheels may be shifted in steering.

Having described my invention, I claim:—

1. The combination of a shaft, a wheel, a universal joint having a pivotal connection to said shaft and a pivotal connection within said wheel, a wheel movable about an axis transverse to said shaft, and means for connecting said wheels so that one is driven from the other.

2. The combination of a journaled shaft, a wheel, a universal joint by which said shaft is connected to and carries said wheel, and a second wheel having an axis of oscillation transverse to said shaft, said wheels being connected.

3. The combination of a journaled shaft, a wheel, a ring having a race-way journaled with relation to said shaft, a ring having a race-way journaled with relation to said wheel, balls disposed between said race ways, and a second wheel connected with the first named wheel.

4. The combination of a journaled shaft, a gear wheel, a universal joint by which said shaft is connected to and carries said gear wheel, a traction wheel having a vertical axis of oscillation, and a gear wheel fixed to said traction wheel and connected with said first mentioned gear wheel.

In testimony whereof, I have hereunto set my name, this 15th day of March, 1907, in the presence of the subscribing witnesses.

TRACY V. BUCKWALTER.

Witnesses:
 ROBERT JAMES EARLEY,
 JOS. G. DENNY, Jr.